Patented Jan. 20, 1953 2,626,271

UNITED STATES PATENT OFFICE 2,626,271

PRODUCTION OF ORGANOHALOSILANES

Arthur J. Barry and Donald E. Hook, Midland, and Lee De Pree, Holland, Mich., assignors to The Dow Chemical Company, Midland, Mich., a corporation of Delaware No Drawing. Application June 6, 1946,
Serial No. 674,925

10 Claims. (Cl. 260—448.2)

This invention relates to the preparation of organohalosilanes having the general formula:

$$R(SiX_3)_n$$

wherein R represents an aliphatic, aryl-aliphatic or alicyclic hydrocarbon radical, X represents a halogen, and $n$ is a whole number. It is particularly concerned with an improved method for the preparation of mono-alkyltrihalosilanes.

Mono-organotrihalosilanes have heretofore been prepared by reacting an inorganic halosilane with a Grignard reagent containing the desired hydrocarbon radical. This usually results in formation of a mixture of products which are difficultly separable. Another known method for the production of mono-organotrihalosilanes involves a reaction between hydrocarbons and inorganic silicon halides in the vapor phase at relatively high temperatures, e. g. above 450° C., and in most instances at 600° C. or higher. This method also yields a mixture of products including by-products formed by thermal decomposition of the reactants.

We have discovered an improved method for the production or organohalosilanes having the above general formula. Briefly, we have found that an organic compound having an olefinic linkage in an aliphatic portion of the molecule, e. g. an olefine, may be caused to combine chemically with a compound of silicon which contains both hydrogen and halogen attached directly to the silicon atom, e. g. $HSiCl_3$, at a temperature of 400° C. or below, by carrying out the reaction at an elevated pressure, for instance, a pressure above 100 pounds, and usually in the order of from 200 to 2500 pounds per square inch, or higher. Pressures of this magnitude may be developed autogenously within a closed system, e. g. by heating, or they may be superimposed, as for example in the development of a hydrostatic pressure. Apparently the rate and efficiency of the reaction are dependent to a large extent upon the proximity of the molecules to be reacted, and hence upon pressure. We have found that operating under such conditions of pressure on a system as to cause a reaction in the liquid phase results in a very rapid reaction with production of the desired compounds, e. g. a mono-alkyltrihalosilane and suppression of formation of less desirable products, such as a tetrahalosilane. The pressure which may most advantageously be employed depends upon the ease, or difficulty, of liquefaction of the hydrocarbon starting material, but in general lies within the range stated above. Thus, for example, the reaction between octadecene and trichlorosilane may be advantageously carried out at a pressure of approximately 300 pounds per square inch. When propylene is employed as the hydrocarbon reactant, pressures as high as 1500 pounds per square inch may be applied.

The reaction may be carried out satisfactorily at temperatures below 400° C., the optimum temperature depending to some extent upon the pressure for instance, upon heating a bomb charged with stoichiometric quantities of reactants, the pressure increases gradually to a maximum at a temperature of from 200° to 300° C., and then, without reaching the theoretical value for the system as estimated by Boyle's law, drops rapidly to approximately the vapor pressure of the organohalosilane reaction product. Continued heating at a temperature of 300° C. or thereabout has little or no effect upon the yield of preferred product. However, heating of the system at temperatures above 385° C. usually results in a renewed upswing in pressure. Examination of the reaction products produced under the latter conditions shows that at the higher temperatures, decomposition or other side reactions adversely affect the yield of organohalosilane.

The reaction is one of addition and by-products are not formed to an appreciable extent. Because of the fact that the products of reaction are hydrolyzable, it is important that the reaction be carried out under substantially anhydrous conditions. Absence of oxygen is also desirable.

A wide variety of unsaturated hydrocarbons has been found satisfactory as starting materials for this process. Examples of compounds which may be used include ethylene, propylene, 1-butene, 2-butene, 1-pentene, 2-pentene, hexene, octene, decene, dodecene, tetradecene, hexadecene, octadecene, butadiene, hexadiene, cyclohexene, styrene, rubber, etc. Apparently any hydrocarbon containing an olefinic linkage in an aliphatic or alicyclic portion of the molecule may be employed. The unsaturated compound may be introduced as such into the reaction zone, or may be formed in situ within said zone. Thus, for example, we may employ alkyl halides capable of yielding unsaturated hydrocarbons, such as ethyl bromide, propyl bromide, butyl chloride, dodecyl chloride, octadecyl chloride, etc. However, when an alkyl halide is reacted with a trihalosilane under the conditions of our process, one mol of silicon tetrahalide is produced for each mol of alkyl halide consumed in the reaction. Accordingly, the reaction of 1 gram molecular weight of alkyl halide requires twice the amount of halosilane which is consumed by the reaction of 1 gram molecular weight of olefinic hydrocarbon. Commercial grades of the starting materials may be employed, although impurities present in the reactants frequently take part in side reactions which may consume a portion of the halosilane and may result in lowered yields of the desired product.

Halosilanes which may be satisfactorily employed under the conditions of the invention are compounds of silicon containing both halogen and hydrogen atoms attached directly to the silicon atom in the molecule. We prefer trichlorosilane, $HSiCl_3$, although tribromosilane, $HSiBr_3$, dichloromonofluorosilane, $HSiFCl_2$, monobromodichlorosilane, $HSiBrCl_2$, etc., may be employed.

The preferred method of practicing the invention involves heating a mixture of an olefine and a trihalosilane under pressure in a suitable reaction vessel, e. g. a bomb or autoclave. Usually from 0.5 to 3.0 molar equivalent weights of trihalosilane are employed for each molar equivalent of hydrocarbon material, although much greater or smaller proportions may also be used. It is sometimes advantageous, but not necessary, to employ an inert mutual solvent for the reactants, so as to insure mutual solution thereof, or to facilitate the formation of a liquid phase. In one mode of operation, the mixture is heated under pressure in a closed system at a reaction temperature below 400° C. Once initiated, the reaction proceeds rapidly until one of the components is substantially exhausted, as indicated by the reduction in pressure. Thereafter, the reaction products and any unreacted materials are withdrawn from the reactor and purified, e. g. by fractional distillation. Unreacted components may be returned to stock for further processing.

The process may also be carried out in continuous manner, e. g. by passing a stream of the reaction mixture under pressure through a heated tubular autoclave.

The following examples illustrate certain ways in which the principle of the invention has been applied, but are not to be construed as limiting the invention:

Example 1

Approximately 406.5 grams (3 mols) of trichlorosilane and 101 grams (3.6 mols) of ethylene were charged into a bomb of 2.4 liters capacity. The bomb was heated externally, while being rotated, and in a period of about 1 hour was brought to a temperature of approximately 300° C. as measured by a thermocouple in a thermocouple well. The maximum pressure attained within the system was 1090 pounds per square inch, at which time the temperature reading was 290° C. Thereafter, the pressure dropped rapidly becoming substantially constant at approximately 360 pounds. At the end of 16 hours, the bomb was cooled and vented through condensers. The condensate was subsequently fractionally distilled. As a fraction distilling at from 96.5° to 96.75° C./737 mm., there was obtained ethyl trichlorosilane in the amount of approximately 2.0 gram mols. Unreacted trichlorosilane was also recovered.

Example 2

In a bomb of 2.4 liters capacity, 3 gram mols of propylene and 3 gram mols of tricholorosilane were reacted by heating at temperatures in the vicinity of 300° C. for about 16 hours. During the first 8 hours of the reaction period, the temperature and pressure of the reaction mixture were observed from time to time. The following table gives the time after the start of the reaction at which each observation was made and the temperature and pressure values observed.

TABLE

| Time, Hours | Temperature, °C. | Pressure, Lbs./Sq. In. |
|---|---|---|
| 0 | 70 | 60 |
| 1 | 250 | 1,050 |
| 1.2 | 290 | 1,090 |
| 1.5 | 300 | 1,000 |
| 2 | 300 | 800 |
| 3 | 300 | 650 |
| 5 | 300 | 525 |
| 7 | 290 | 400 |
| 8 | 290 | 380 |
| 16 | 290 | 320 |

After completing the reaction, the products were separated as in the preceding example. As the major reaction product, distilling at from 122° to 123.5° C. at 740 millimeters absolute pressure, there was obtained 2.3 gram mols of propyl trichlorosilane. There were also obtained unreacted trichlorosilane and a minor amount of a product, distilling at 98° C. at 50 millimeters absolute pressure and having a composition corresponding to that of the formula $C_6H_{13}SiCl_3$. Apparently a portion of the propylene polymerized before reacting with the tricholorosilane.

In another experiment, a bomb charged with 3 gram mols of propylene and 6 gram mols of trichlorosilane, was heated at approximately 300° C. The maximum pressure was observed at approximately 279–290° C., and within 0.5 hour thereafter had dropped to its minimum, substantially constant value. Heating was continued for 16 hours, after which the reaction products were collected and purified as before. There was obtained approximately 2.9 gram mols of propyl trichlorosilane, or a yield of 96 per cent of theoretical, based on the propylene introduced. Approximately 2.73 gram mols of trichlorosilane was also recovered.

Example 3

This example illustrates the use of a high-boiling inert solvent for the reactants.

The first experiment described in Example 2 was repeated, except that 838 grams of light paraffin oil was also charged into the bomb. The maximum pressure observed during the experiment was 1000 pounds. There was obtained approximately 2.4 gram mols of propyl trichlorosilane.

Example 4

Operating in a manner similar to that described in Example 2, equimolecular proportions of propylene and tribromosilane were reacted. The highest pressure reached within the system was 500 pounds per square inch at a recorded temperature of 201° C. Thereafter the pressure decreased rapidly. The temperature was maintained at from 225° to 248° C. for 7.5 hours, after which the reaction products were collected and purified as in the preceding examples. As a fraction distilling at temperatures of from 181° to 184° C., principally at 183° C., at 746 millimeters absolute pressure, there was obtained propyl tribromosilane, having a specific gravity of 1.810 at 20° C. The yield was 70 per cent of theoretical. A minor amount of $SiBr_4$ was produced. Unreacted tribromosilane was also recovered.

Example 5

A mixture of 0.5 gram mol of butene-1 and 0.5 gram mol of trichlorosilane was charged into a bomb of 500 milliliter capacity, and the bomb was externally heated to a temperature of from 263° to 284° C. for approximately 16 hours. The product consisted for the most part of n-butyl-trichlorosilane distilling at from 148° to 151° C. together with a minor amount of sec.-butyl trichlorosilane, distilling at from 143° to 146° C.

Example 6

The procedure described in Example 5 was repeated, except that butene-2 was employed as the alkene reactant. The product, sec.-butyl trichlorosilane, distilling principally between 143° and 146° C., had a density of 1.188 at 20° C. So far as is known, sec.-butyl trichlorosilane has not previously been isolated and characterized.

Example 7

By procedure similar to that described in Example 5, 0.68 gram mol of isobutene and 0.5 gram mol of trochlorosilane were reacted. As a fraction distilling at from 138° to 143° C., there was obtained 0.41 gram mol of isobutyl trichlorosilane.

Example 8

By procedure similar to that described in Example 2, 3 gram mols of octene and 3 gram mols of trichlorosilane were reacted. The maximum pressure developed within the reaction system was 560 pounds per square inch. The yield of octyl trichlorosilane, $C_8H_{17}SiCl_3$, was approximately 2.4 gram mols, or 80 per cent of theoretical. The compound is a colorless liquid, which distills at from 115° to 116° C. at 20 millimeters absolute pressure, and has a specific gravity of 1.068 at 20° C.

Example 9

By procedure similar to that described in Example 5, 0.75 gram mol of decene-1 and 1.0 gram mol of trichlorosilane were reacted at a temperature of from 315° to 330° C. The total charge of starting materials amounted to 240.7 grams. The product consisted of 237.4 grams of a light yellow liquid, of which approximately 181 grams was decyl trichlorosilane, $C_{10}H_{21}SiCl_3$. This new compound is a colorless liquid which distills at from 104° to 107.5° C. at 2.25 millimeters absolute pressure. It has a specific gravity of 1.048 at 20° C.

Example 10

By procedure similar to that described in preceding examples, dodecene was reacted with trichlorosilane and the products collected and purified as before. As a fraction distilling at temperatures from 150° to 159° C. and principally from 154° to 158° C., at 10 millimeters absolute pressure, there was obtained dodecyl trichlorosilane, $C_{12}H_{25}SiCl_3$, in 83.5 per cent of the theoretical yield.

Example 11

By procedure similar to that described in Example 5, 166.1 grams of an equimolecular mixture of tetradecene and trichlorosilane were reacted within a bomb. The bomb and contents was heated at from 293° to 315° C. for 16 hours. Tetradecyl trichlorosilane, $C_{14}H_{29}SiCl_3$, was obtained as a colorless liquid, distilling at from 147° to 158° C. at 3.0 to 3.1 millimeters absolute pressure.

Example 12

By procedure similar to that described in Example 1, octadecene was reacted with trichlorosilane and the products collected. Octadecyl trichlorosilane, $C_{18}H_{37}SiCl_3$, was obtained in 87.7 per cent of the theoretical yield. It is a colorless liquid, distilling at approximately 270° C. at 50 millimeters.

Example 13

By procedure similar to that described in Example 5, 1,5-hexadiene (2.0 gram mols) and trichlorosilane (4.0 gram mols) were reacted. The bomb was maintained at approximately 300° C. for 16 hours. The pressure maximum was observed at a temperature of 280° C. There was obtained

| Product | Yield | Boiling Range |
|---|---|---|
| | Gram mols | |
| $C_6H_{11}SiCl_3$ | 0.47 | 103–106° C./50mm.; 70–72° C./10 mm. |
| $Cl_3SiC_6H_{12}SiCl_3$ | 0.91 | 149–151° C./10 mm. |
| $C_3H_7SiCl_3$ | 0.15 | 124.5–125.0° C. |

Unreacted trichlorosilane was also recovered.

In a similar experiment in which the mol ratio of hexadiene to trichlorosilane was 1:1, the bomb was cooled at the end of 2.5 hours, and the product analyzed. The molecular ratio of $C_6H_{11}SiCl_3$ to $Cl_3SiC_6H_{12}SiCl_3$ in the product was 1.2 to 1.

In another run, the starting mixture comprised 4 gram mols of 1,5-hexadiene and 3 gram mols of trichlorosilane. The bomb was maintained at a temperature of approximately 300° C. for 6 hours, after which it was cooled and the product was analyzed. The reaction product comprised hexenyl trichlorosilane, $C_6H_{12}SiCl_3$, and bis(trichlorosilyl)hexane, $Cl_3SiC_6H_{12}SiCl_3$, in the molecular ratio of 2.0 to 1.

Example 14

By procedure similar to that described in preceding examples, rubber having an iodine number of 313.2 was reacted with trichlorosilane in the presence of benzene. The product was heated on the steam bath under reduced pressure to volatilize unreacted trichlorosilane, benzene, etc. The gummy residue was soluble in benzene. It contained 11.7 per cent silicon and 39.4 per cent chlorine.

Example 15

A copolymer of 75 parts by weight of butadiene and 25 parts of styrene and having an iodine number of 313.7 was reacted with trichlorosilane by procedure similar to that described in preceding examples. The charge consisted of 36 grams of the butadiene-styrene copolymer, 67.8 grams of trichlorosilane, and 78 grams of benzene. The reaction mixture was maintained in a bomb at a temperature of from 293° to 314° C. for 16 hours.

There was obtained 174 grams of a liquid which was subsequently heated under reduced pressure on a steam bath to volatilize low-boiling components, e. g. trichlorosilane, benzene, etc. The residue consisted of a gum which had a silicon content of 10.1 per cent. The maximum silicon content possible was 13.5 per cent, based on the degree of unsaturation of the starting material. The product reacted with water to produce a brittle solid.

In the claims the terms "diolefine" and "polyolefine" pertain to hydrocarbons having a plurality of olefinic linkages in the molecule.

Other modes of applying the principle of the inventon may be employed instead of those explained, change being made as regards the methods and materials herein disclosed, provided the steps or compounds stated by any of the following claims or equivalent of such steps or compounds be employed.

We therefore point out and distinctly claim:

1. The process which comprises reacting a polyolefine with trichlorosilane at a pressure of at least 200 pounds per square inch, and a temperature below 385° C., in the absence of catalysts for effecting the polymerization of olefines and in the absence of catalysts for Friedel-Crafts reactions.

2. The process which comprises reacting hexadiene with trichlorosilane at a pressure of at least 200 pounds per square inch, and a temperature below 385° C., in the absence of catalysts for effecting the polymerization of olefines and in the absence of catalysts for Friedel-Crafts reactions.

3. A process for the preparation of an alkenyl trichlorosilane which comprises reacting a diolefine with trichlorosilane at a pressure of at least 200 pounds per square inch, and a temperature below 385° C., in the absence of catalysts for effecting the polymerization of olefines and in the absence of catalysts for Friedel-Crafts reactions.

4. The method of making organosilicon compounds which comprises heating in the absence of a catalyst an olefin with a halosilane containing only hydrogen, halogen and silicon atoms, at an elevated temperature not above about 380° C. under superatmospheric pressure generated autogenously in a closed system.

5. The method of making organosilicon compounds which comprises reacting a hydrocarbon containing an olefinic linkage with a halosilane containing only hydrogen, halogen and silicon atoms at a temperature below 400° C. under elevated pressure, in the absence of a catalyst for the polymerization of olefins.

6. The method of making organosilicon compounds which comprises reacting a hydrocarbon containing an olefinic linkage with a halosilane containing only hydrogen, halogen and silicon atoms, at a temperature below 400° C. in liquid phase, in the absence of a catalyst for the polymerization of olefins.

7. The method of making organosilicon compounds which comprises reacting a hydrocarbon containing only one olefinic linkage in the molecule with a halosilane containing only hydrogen, halogen and silicon atoms at a temperature below 400° C. under elevated pressure, in the absence of a catalyst for the polymerization of olefins.

8. A process for the preparation of an organohalosilane having the general formula $R(SiX_3)_n$ where R is selected from the group consisting of aliphatic, arylaliphatic, and alicyclic hydrocarbon radicals, X is a halogen atom and $n$ is a whole number, which comprises chemically combining a hydrocarbon containing an olefinic linkage with a halosilane containing only hydrogen, halogen, and silicon atoms, at a temperature below 400° C., under elevated pressure, in the absence of a catalyst for the polymerization of olefines and in the absence of a catalyst for Friedel-Crafts reactions.

9. A process for the preparation of an organohalosilane having the general formula $R(SiX_3)_n$ where R is selected from the group consisting of aliphatic, arylaliphatic, and alicyclic hydrocarbon radicals, X is a halogen atom and $n$ is a whole number, which comprises chemically combining a hydrocarbon containing an olefinic linkage with a halosilane containing only hydrogen, halogen, and silicon atoms, at a temperature below 400° C., in liquid phase, in the absence of a catalyst for the polymerization of olefins and in the absence of a catalyst for Friedel-Crafts reactions.

10. A liquid alkenyl trichlorosilane having the formula, $H_2C=CHCH_2CH_2CH_2CH_2SiCl_3$, and distilling at approximately 103–104° C. at 50 millimeters absolute pressure.

ARTHUR J. BARRY.
DONALD E. HOOK.
LEE DE PREE.

REFERENCES CITED

The following references are of record in the file of this patent:

UNITED STATES PATENTS

| Number | Name | Date |
|---|---|---|
| 2,224,359 | Rosenblum | Dec. 10, 1940 |
| 2,306,222 | Patnode | Dec. 22, 1942 |
| 2,379,821 | Miller et al. | July 3, 1945 |
| 2,381,000 | Patnode | Aug. 7, 1945 |
| 2,405,019 | Dalen | July 30, 1946 |
| 2,407,181 | Scott | Sept. 3, 1946 |

OTHER REFERENCES

Rochow, Chem. Engineering News, vol. 23 (7), pp. 612–16 (April 1945).

Nieuwland et al., Chem. Absts., vol. 24, p. 1842 (1930).

Bygden, Ber. Deut. Chem., vol. 44, pp. 2640–52 (1911).

Bruttner et al., Ber. Deut. Chem., vol. 51, p. 1289 (1918), (complete article pp. 1283–1293).